(12) United States Patent
Park

(10) Patent No.: US 12,030,461 B2
(45) Date of Patent: Jul. 9, 2024

(54) VEHICLE GLOVE BOX ASSEMBLY

(71) Applicant: HYUNDAI MOBIS Co., Ltd., Seoul (KR)

(72) Inventor: Jae Whaon Park, Cheonan-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 288 days.

(21) Appl. No.: 17/477,003

(22) Filed: Sep. 16, 2021

(65) Prior Publication Data

US 2022/0089095 A1 Mar. 24, 2022

(30) Foreign Application Priority Data

Sep. 21, 2020 (KR) .................. 10-2020-0121649

(51) Int. Cl.
*B60R 7/06* (2006.01)

(52) U.S. Cl.
CPC ..................... *B60R 7/06* (2013.01)

(58) Field of Classification Search
CPC ....................................... B60R 7/06
USPC ........................ 220/830; 224/483
See application file for complete search history.

(56) References Cited

U.S. PATENT DOCUMENTS

| | | | | |
|---|---|---|---|---|
| 1,893,624 A | * | 1/1933 | Webb | A24F 15/00 |
| | | | | 312/246 |
| 2,883,234 A | * | 4/1959 | Biondo | B60R 7/06 |
| | | | | 296/37.9 |
| 4,596,416 A | * | 6/1986 | Muller | B60R 7/06 |
| | | | | 224/282 |
| 5,558,385 A | * | 9/1996 | Gross | E05B 83/30 |
| | | | | 70/258 |
| 8,393,663 B2 | * | 3/2013 | Gayon | B60R 7/06 |
| | | | | 312/246 |
| 2006/0054630 A1 | | 3/2006 | Katagiri | |
| 2010/0148531 A1 | | 6/2010 | Evans et al. | |
| 2013/0118089 A1 | | 5/2013 | Schulz | |
| 2014/0131357 A1 | | 5/2014 | Hirama et al. | |
| 2016/0297368 A1 | | 10/2016 | Huebner et al. | |

FOREIGN PATENT DOCUMENTS

| | | |
|---|---|---|
| CN | 104271402 A | 1/2015 |
| FR | 3107679 A1 * | 9/2021 |
| JP | 6154353 B2 | 6/2017 |
| WO | 2008/075622 A1 | 6/2008 |
| WO | 2018/128979 A1 | 7/2018 |

OTHER PUBLICATIONS

English translation of FR 3107679 (Year: 2023).*
Extended European Search Report issued in corresponding European Patent Application No. 21196467.1 dated Jan. 18, 2022.

* cited by examiner

*Primary Examiner* — James N Smalley
(74) *Attorney, Agent, or Firm* — Morgan, Lewis & Bockius LLP

(57) ABSTRACT

The present disclosure includes a cover which is accommodated in a dashboard near to a passenger seat and which is open in a forward direction, a housing which is accommodated in the cover and selectively opened or closed through a front surface of the cover, a rotating member which is disposed between the cover and the housing and forms a rotation orbit so that the housing is opened or closed through the cover, and an elastic member having a first end coupled to the rotating member and a second end coupled to the cover.

19 Claims, 12 Drawing Sheets

400: 410, 420
420: 421, 422, 423, 424

VEHICLE GLOVE BOX ASSEMBLY

CROSS-REFERENCE TO RELATED APPLICATION

This application claims priority to and the benefit of Korean Patent Application No. 10-2020-0121649, filed on Sep. 21, 2020, the disclosure of which is incorporated herein by reference in its entirety.

BACKGROUND

1. Technical Field

The present disclosure relates to a glove box operating device installed in a dashboard of a vehicle, and more specifically, to a vehicle glove box assembly allowing storage capacity of a glove box to be increased and convenience in use to be improved.

2. Discussion of Related Art

Generally, a dashboard is installed in front of driver and passenger seats, various instruments and switches are installed in the dashboard in front of the driver seat, and a glove box for storing simple objects is installed in the dashboard in front of the passenger seat.

In addition, an audio system and the like are installed in a central portion between the dashboard, in which the various instruments are installed, in front of the driver seat and the dashboard, in which the glove box is installed, in front of the passenger seat.

The glove box is installed in the dashboard positioned in front of the passenger so that a passenger and a driver can insert objects such as driving necessities or other stuffs thereinto and is used for the convenience of the passenger and the driver.

To this end, a storage space is provided in the dashboard, and the glove box is accommodated in the storage space and opened or closed using a locking device.

The glove box may be mainly divided into a rotating type glove box and a sliding type glove box.

In the rotating type glove box, one hinge shaft is disposed under a rear side of a housing for accommodating objects and is rotated to open the housing.

In the rotating type glove box, when the housing is deeper, a rear upper corner of the housing collides with an inner upper surface of the dashboard when the housing is rotated.

Accordingly, since the rotating type glove box is not deep, a dead space is unavoidably formed behind the housing of the dashboard in a region in which the glove box is coupled to the dashboard.

In addition, in the sliding type glove box, a housing is withdrawn in a sliding manner to open the glove box.

Accordingly, in the sliding type glove box, the housing may be formed to be deep unlike the rotating type glove box.

However, in the sliding type glove box, in a case in which driving necessities or other stuffs are accommodated in the housing so that heights of the necessities or other stuffs are greater than a height of the housing, in a process in which the housing is withdrawn from a dashboard, the driving necessities or the other stuffs are jammed in an entrance region of the dashboard.

Accordingly, in the sliding type glove box, a dead space is unavoidably formed in an upward side of the housing.

In addition, conventionally, in a case in which many objects or heavy objects are accommodated in a housing of a glove box, there is a problem in that an excessive force should be applied by a user when the glove box is closed.

Accordingly, although people in the relevant field have been looking for ways to increase a storage capacity of a glove box and easily close the glove box using a dead space formed in a rear portion and an upper portion in a dashboard, satisfactory results have not been obtained yet.

SUMMARY

The present disclosure is directed to providing a vehicle glove box assembly allowing a storage capacity of a glove box to be increased and the glove box to be easily closed using a dead space formed in a rear portion and an upper portion in a dashboard.

The above-described objectives, other objectives, advantages, features, and methods of achieving the advantages, features, and objectives will be clear with reference to the accompanying drawings and embodiments which will be described in detail.

According to one aspect of the present disclosure, a vehicle glove box assembly includes a cover which is accommodated in a dashboard near to a passenger seat and which is open in a forward direction, a housing which is accommodated in the cover and selectively opened or closed through a front surface of the cover, a rotating member which is disposed between the cover and the housing and which is configured to have a rotation orbit, in which the housing is opened or closed through the cover, and an elastic member having a first end coupled to the rotating member and a second end coupled to the cover.

The elastic member may be formed as a torsion spring.

The rotating member may include a first rotation link having a first end coupled to a lower portion of the cover and a second end coupled to an upper portion of the housing, and a second rotation link which is spaced apart from the first rotation link in the forward direction and having a first end coupled to the lower portion of the cover and a second end coupled to the upper portion of the housing.

The first rotation link may include a first connect bar having a first end rotatably coupled to the lower portion of the cover and a second end rotatably coupled to the upper portion of the housing, a first hinge shaft formed at the first end of the first connect bar and coupled to the lower portion of the cover, a first driving shaft formed at the second end of the first connect bar and coupled to the upper portion of the housing, and a link fixing protrusion disposed between the first end and the second end of the first connect bar.

A cover fixing protrusion may be disposed on the cover at a position spaced apart from the link fixing protrusion in the forward direction.

In the elastic member, the first end may be coupled to the cover fixing protrusion and the second end may be coupled to the link fixing protrusion.

When the link fixing protrusion is positioned above a virtual line connecting the first rotating shaft and the cover fixing protrusion, the rotating member may elastically rotate in a direction in which the housing is closed, and when the link fixing protrusion is positioned under the virtual line, the rotating member may elastically rotate in a direction in which the housing is opened.

A distance between the first end and the second end of the elastic member in a state in which the housing is closed may be greater than a distance therebetween in a state in which the housing is open.

A guide hole having a fan shape may be formed in the cover in a direction perpendicular to the second rotation link.

The second rotation link may include a second connect bar having a first end rotatably coupled to the lower portion of the cover and a second end rotatably coupled to the upper portion of the housing, the second hinge shaft formed at the first end of the second connect bar and coupled to the lower portion of the cover, a second driving shaft formed at the second end of the second connect bar and coupled to the upper portion of the housing, and a guide protrusion which extends between the first end and the second end of the second connect bar in a rearward direction and is slidably coupled to the guide hole.

The guide hole may be concentric with the second hinge shaft.

The guide protrusion may slide along the guide hole to open or close the housing.

When the housing is opened and the rotating member rotates along the guide hole in the forward direction, the housing may be rotated in a downward direction from the cover.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
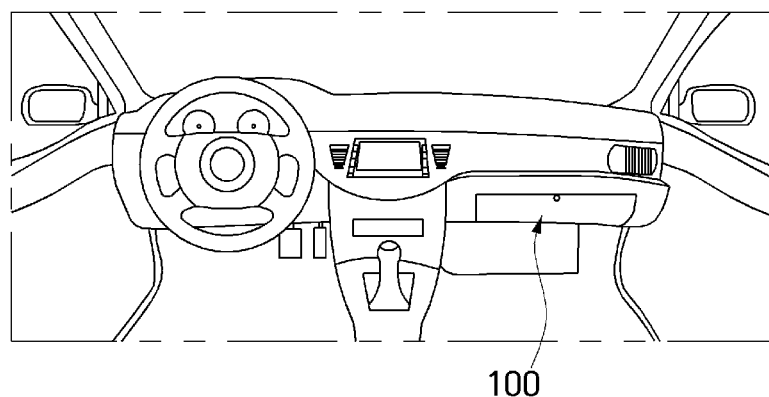
FIG. 1 is a schematic view illustrating an interior of a vehicle in order to show a position at which a vehicle glove box assembly is installed according to one embodiment of the present disclosure.

Embodiments of the present disclosure are provided to more completely describe the present disclosure to those skilled in the art, the embodiments described below will be changed into various different forms, and the scope of the present disclosure is not limited to the following embodiments. Further, the embodiments are provided to make the present disclosure more complete and true and to convey the spirit of the present disclosure to those skilled in the art. In addition, components in the accompanying drawings are exaggeratedly illustrated for convenience and clarity of description, and components that are the same are referred to by the same reference numerals in the drawings. As described in the present specification, the term "and/or" includes any and all combinations of the associated listed items.

The terms used herein are provided only to describe specific embodiments of the present disclosure and are not for purposes of limitation.

As used in the present specification, unless the context clearly indicates otherwise, the singular forms described in the specification include the plural forms. In addition, the terms "comprise" or "comprising," when used herein, specify the presence of some stated shapes, numbers, steps, operations, members, elements, and/or groups thereof but do not preclude the presence or addition of one or more other shapes, numbers, operations, members, elements, and/or groups thereof.

Hereinafter, exemplary embodiments of the present disclosure will be described in detail with reference to the accompanying drawings.

Figure 2:
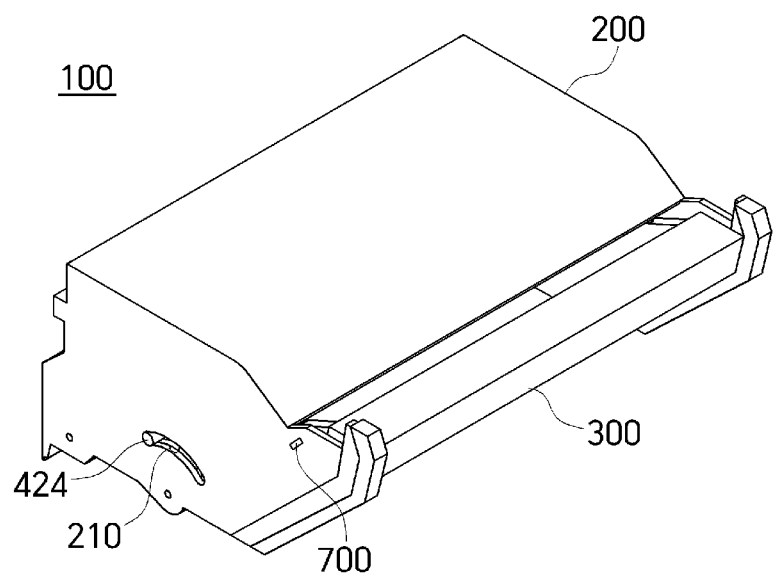
FIG. 2 is a perspective view illustrating the vehicle glove box assembly according to one embodiment of the present disclosure.
Figure 3:
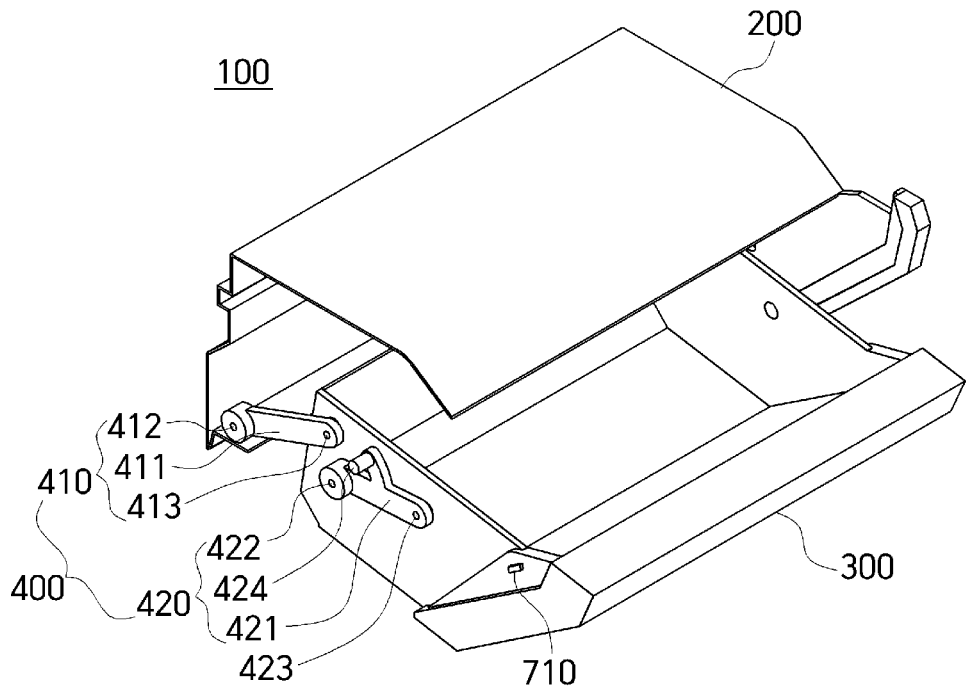
FIG. 3 is a perspective view illustrating a state in which a housing of the vehicle glove box assembly is opened according to one embodiment of the present disclosure.
Figure 4:
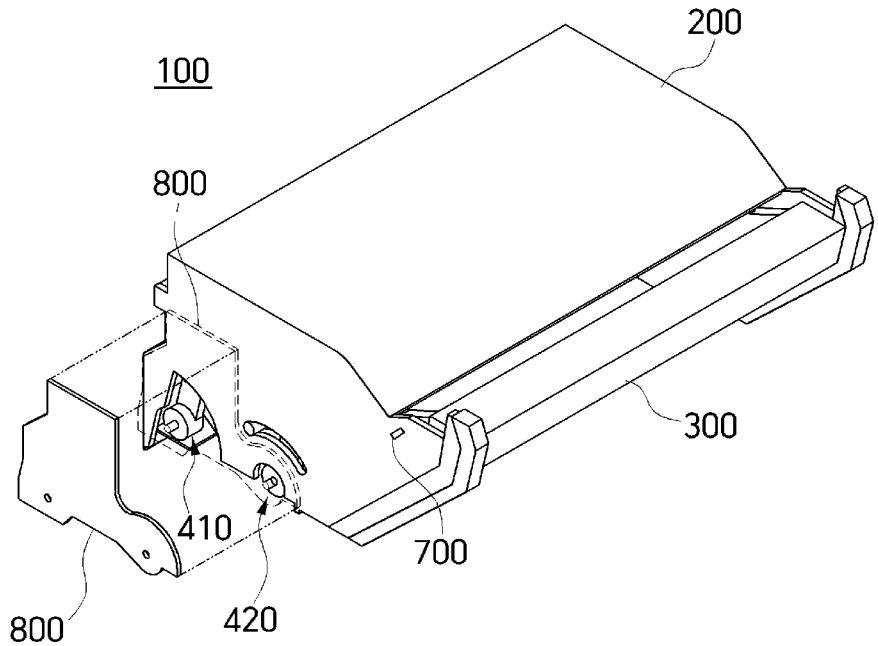
FIG. 4 is a perspective view illustrating the vehicle glove box assembly according to one embodiment of the present disclosure.

FIG. 1 is a schematic view illustrating an interior of a vehicle in order to show a position at which a vehicle glove box assembly is installed according to one embodiment of the present disclosure, FIG. 2 is a perspective view illustrating the vehicle glove box assembly according to one embodiment of the present disclosure, FIG. 3 is a perspective view illustrating a state in which a housing of the vehicle glove box assembly is opened according to one embodiment of the present disclosure, and FIG. 4 is a perspective view illustrating the vehicle glove box assembly according to one embodiment of the present disclosure.

Referring to FIGS. 1 to 4, a vehicle glove box assembly 100 according to one embodiment of the present disclosure is accommodated inside a dashboard in front of an assistant seat.

The vehicle glove box assembly 100 according to one embodiment of the present disclosure includes a cover 200, a housing 300, a rotating member 400, and a locking member 700.

The cover 200 is accommodated inside the dashboard in front of the assistant seat and a front surface and a lower surface are open.

That is, an upper surface, both side surfaces, and a rear surface of the cover 200 are closed.

Accordingly, when the housing 300 rotatably coupled to the cover 200 rotates in the cover 200, the housing 300 protrudes in a forward direction and a downward direction of the cover 200 so that the housing easily rotates.

In addition, a guide hole 210 is formed in the cover 200.

The guide hole 210 is a hole formed in a direction perpendicular to a second rotation link 420, guides a rotational direction of the rotating member 400, and restricts a rotation distance.

The housing 300 is rotatably accommodated in the cover 200 and selectively opened or closed through a front surface of the cover 200.

A storage space is formed in the housing 300, and objects such as driving necessities or other stuffs may be accommodated in the housing.

The rotating member 400 is formed as a plurality of rotating members 400 and forms a rotation orbit so that the housing 300 is opened or closed through the cover 200.

The rotating member 400 is disposed between the cover 200 and the housing 300.

In addition, the rotating member 400 is disposed between the cover 200 and the housing 300, one end of the rotating member 400 is coupled to the cover 200, and the other end thereof is coupled to the housing 300.

The rotating member 400 includes a first rotation link 410 and a second rotation link 420.

The entirety of the first rotation link 410 is formed in a bar shape and disposed at each of both sides of the housing 300.

In addition, one end of the first rotation link 410 is coupled to a lower portion of the cover 200, and the other end is coupled to an upper portion of the housing 300.

When one end of the first rotation link 410 is rotated with respect to the cover 200, the other end of the first rotation link 410 is rotated with respect to the housing 300 to rotate the housing 300 in the downward direction.

The first rotation link 410 includes a first connect bar 411, a first hinge shaft 412, and a first driving shaft 413.

The first connect bar 411 forms a body of the first rotation link 410 and is disposed in a rearward direction of the housing 300 among a plurality of rotation links.

The first connect bar 411 extends in a direction from the lower portion of the cover 200 toward the upper portion of the housing 300.

In addition, one end of the first connect bar 411 is rotatably coupled to the lower portion of the cover 200, and the other end is rotatably coupled to the upper portion of the housing 300.

Since the first connect bar 411 is rotatably coupled to the cover 200 and the housing 300, the first connect bar 411 rotates the housing 300 with respect to the cover 200 to open or close the housing 300.

The first hinge shaft 412 protrudes from an outer side surface of one end portion of the first connect bar 411 in a direction in which the cover 200 is disposed.

The first hinge shaft 412 is rotatably coupled to the lower portion of the cover 200.

That is, the first hinge shaft 412 rotates the first connect bar 411 with respect to the cover 200.

The first driving shaft 413 protrudes from an inner side surface of the other end portion of the first connect bar 411 in a direction in which the housing 300 is disposed.

The first driving shaft 413 is rotatably coupled to the upper portion of the housing 300.

That is, when the first connect bar 411 rotates about the first hinge shaft 412, the first driving shaft 413 rotates the housing 300 in a rotational direction of the first connect bar 411.

The second rotation link 420 is disposed between the cover 200 and the housing 300 to be spaced apart from the first rotation link 410 in the forward direction.

The entirety of the second rotation link 420 is formed in a bar shape and disposed at each of both sides of the housing 300.

In addition, one end of the second rotation link 420 is coupled to the lower portion of the cover 200, and the other end is coupled to the upper portion of the housing 300.

When one end of the second rotation link 420 rotates with respect to the cover 200, the other end of the second rotation link 420 rotates with respect to the housing 300 to rotate the housing 300 in the downward direction.

The second rotation link 420 includes a second connect bar 421, a second hinge shaft 422, and a second driving shaft 423.

The second connect bar 421 forms a body of the second rotation link 420 and disposed in a forward direction of the housing 300 among the plurality of rotation links.

The second connect bar 421 extends in the direction from the lower portion of the cover 200 toward the upper portion of the housing 300.

In addition, one end of the second connect bar 421 is rotatably coupled to the lower portion of the cover 200, and the other end thereof is rotatably coupled to the upper portion of the housing 300.

Since the second connect bar 421 is rotatably coupled to the cover 200 and the housing 300, the second connect bar 421 rotates the housing 300 with respect to the cover 200 to open or close the housing 300.

The second hinge shaft 422 protrudes from an outer side surface of one end portion of the second connect bar 421 in the direction in which the cover 200 is disposed.

The second hinge shaft 422 is rotatably coupled to the lower portion of the cover 200.

That is, the second hinge shaft 422 rotates the second connect bar 421 with respect to the cover 200.

The second driving shaft 423 protrudes from an inner side surface of the other end portion of the second connect bar 421 in the direction in which the housing 300 is disposed.

The second driving shaft 423 is rotatably coupled to the upper portion of the housing 300.

That is, when the second connect bar 421 rotates about the second hinge shaft 422, the second driving shaft 423 rotates the housing 300 in a rotational direction of the second connect bar 421.

A guide protrusion 424 is disposed between one end of the second connect bar 421 and the other end thereof, extends in a rearward direction, and is slidably coupled to the guide hole 210.

Meanwhile, the guide hole 210 formed in the cover 200 is formed in a fan shape around the second hinge shaft 422.

That is, the guide hole 210 is formed to be concentric with the second hinge shaft 422.

Accordingly, when the housing 300 is opened or closed, the guide protrusion 424 slidably coupled to the guide hole 210 may easily slide along the guide hole 210 while the second rotation link 420 is rotated.

In addition, since the guide hole 210 is formed in the fan shape, the guide hole 210 is formed to have a predetermined angle around the second hinge shaft 422.

The guide hole 210 may be formed to have an angle of about 75° around the second hinge shaft 422.

Accordingly, the guide hole 210 may limit a rotation angle of the guide protrusion 424 to about 75°.

Meanwhile, a length L1 of the first rotation link 410 according to one embodiment of the present disclosure is formed to be greater than a length L2 of the second rotation link 420.

Specifically, the first hinge shaft 412 and the second hinge shaft 422 are formed at the same level.

In addition, the first driving shaft 413 is formed at a position higher than a position of the second driving shaft 423.

Accordingly, when the housing 300 in a state in which the housing 300 is closed through the cover 200 is opened, the first driving shaft 413 rotates about the first hinge shaft 412 to push the housing 300 in the forward direction.

In addition, the second driving shaft 423 rotates about the second hinge shaft 422 to rotate the housing 300 in the downward direction.

Accordingly, the housing 300 is withdrawn from the cover 200 in the forward direction, and at the same time, a front side of the housing 300 is rotated in the downward direction.

That is, as the length L1 of the first rotation link 410 is greater than the length L2 of the second rotation link 420, an angle at which the front side of the housing 300 is rotated in the downward direction is relatively large.

Accordingly, since the glove box assembly 100 of the present disclosure may accommodate objects in a rear region and an upper region of the housing 300 in the dashboard, the storage capacity of the housing 300 can be significantly increased.

The locking member 700 is disposed at each of an upper portion of the cover 200 and the upper portion of the housing 300 to couple the housing 300 to the cover 200.

That is, the locking member 700 suppresses the housing 300 from being opened due to vibration of a vehicle or external force while the vehicle travels.

the locking member 700 includes a locking protrusion 710 and a locking hole 720.

The locking protrusion 710 is a protrusion extending in a direction from the cover 200 toward the housing 300 and is coupled to the housing 300 to suppress the housing 300 from being opened through the cover 200 when the housing 300 is closed.

The locking hole 720 is formed at a position, which corresponds to the locking protrusion 710, in the housing 300, and when the housing 300 is closed, the locking protrusion 710 is inserted into the locking hole 720.

Accordingly, the locking member 700 can effectively suppress the housing 300 from being opened due to vibration of a vehicle or an external force when the vehicle travels.

Particularly, the locking member 700 is positioned higher than the rotating member 400.

Accordingly, the locking member may improve stability of the housing 300 in a state in which the housing 300 is closed through the cover 200.

Meanwhile, one embodiment of the present disclosure may further include a reinforcement plate 800.

The reinforcement plate 800 is disposed on an outer side surface of the cover 200 and may be formed of a metal material.

In addition, the first hinge shaft 412 and the first driving shaft 413 of the first rotation link 410 and the second hinge shaft 422 and the second driving shaft 423 of the second rotation link 420 pass through the cover 200 and are rotatably fixed to the reinforcement plate 800.

That is, since the reinforcement plate 800 formed of the metal material is disposed on the outer side surface of the cover 200 and fixes the first rotation link 410 and the second rotation link 420, the rotating member 400 may be more firmly fixed.

An operation process of the vehicle glove box assembly according to one embodiment of the present disclosure formed to have the above-described structure will be described with reference to the accompanying drawings.

Figure 5A:
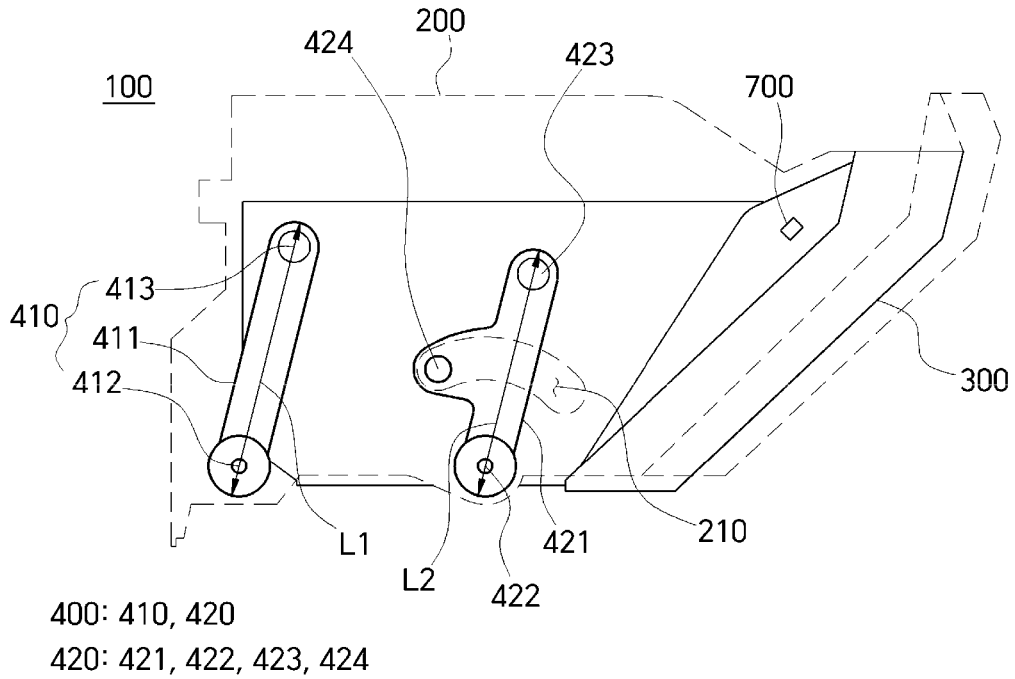
FIGS. 5A to 5C are views illustrating operation states of the vehicle glove box assembly according to one embodiment of the present disclosure.
Figure 5B:
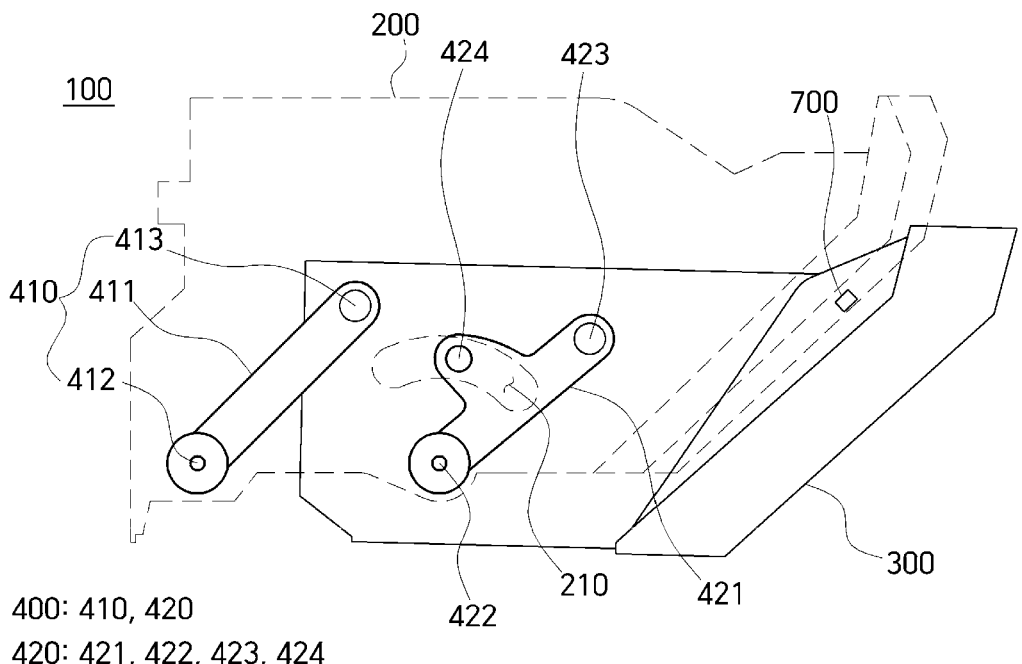
Figure 5C:
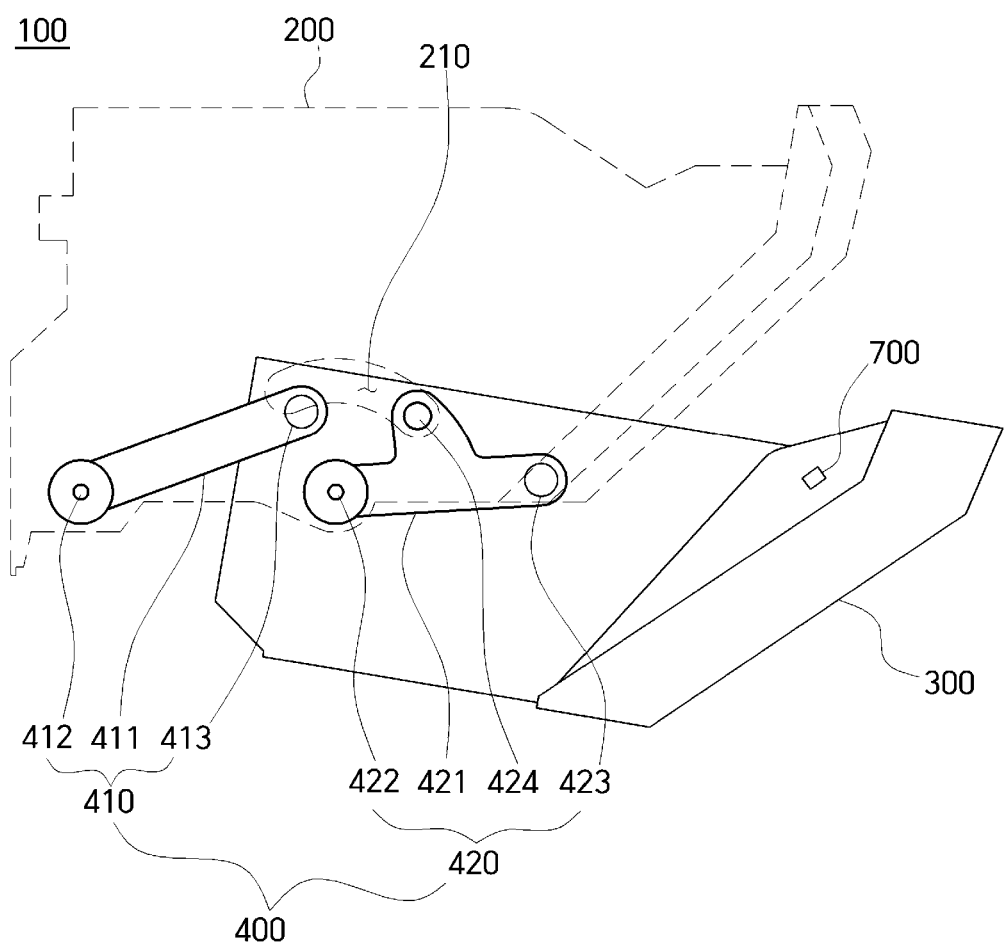

FIGS. 5A to 5C are views illustrating operation states of the vehicle glove box assembly according to one embodiment of the present disclosure.

Referring to FIG. 5A, in a state in which the housing 300 is accommodated in and closed through the cover 200, the guide protrusion 424 of the second rotation link 420 is coupled to the guide hole 210, and in the state in which the housing 300 is accommodated in and closed through the cover 200, the guide protrusion 424 is disposed in a region, which is disposed at a rear side of the housing 300, in the guide hole 210.

Meanwhile, the length L1 of the first rotation link 410 is formed to be greater than the length L2 of the second rotation link 420.

Specifically, the first hinge shaft 412 of the first rotation link 410 and the second hinge shaft 422 of the second rotation link 420 are formed at the same level, and the first driving shaft 413 of the first rotation link 410 is formed at a position higher than a position of the second driving shaft 423 of the second rotation link 420.

Accordingly, when the user opens the housing from the cover, as illustrated in FIG. 5B, the first driving shaft 413 rotates about the first hinge shaft 412 while pushing the housing 300 in the forward direction, and the second driving shaft 423 rotates about the second hinge shaft 422 along the guide hole 210 to rotate housing 300 in the downward direction.

Accordingly, as illustrated in FIG. 5C, the housing 300 is withdrawn from the cover 200 in the forward direction and at the same time, a front side of the housing 300 rotates in the downward direction.

Meanwhile, a housing 300 according to another embodiment of the present disclosure may be opened or closed by an elastic member 500.

Hereinafter, a vehicle glove box assembly according to another embodiment of the present disclosure will be described with reference to the accompanying drawings.

Figure 6:
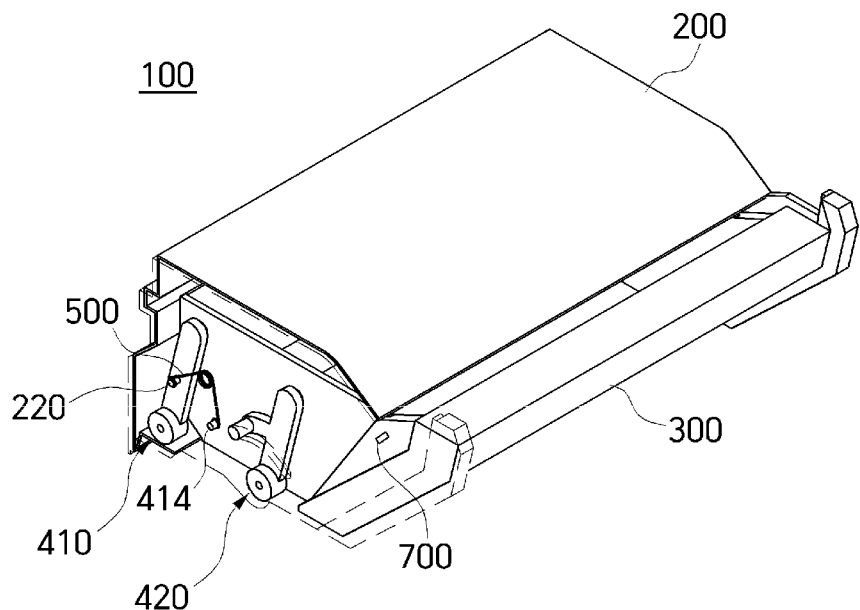
FIG. 6 is a perspective view illustrating a vehicle glove box assembly according to another embodiment of the present disclosure.

FIG. 6 is a perspective view illustrating a vehicle glove box assembly according to another embodiment of the present disclosure.

Referring to FIG. 6, a cover fixing protrusion 220 coupled to one end of the elastic member 500 is formed on a cover 200 according to another embodiment of the present disclosure.

The cover fixing protrusion 220 protrudes from one surface of the cover 200 in a direction in which a rotating member 400 is disposed.

In addition, a link fixing protrusion 414 coupled to the other end of the elastic member 500 is formed on a first rotation link 410 according to another embodiment of the present disclosure.

The link fixing protrusion 414 is formed between one end of a first connect bar 411 and the other end thereof and protrudes from one surface of the first connect bar in a direction in which the cover 200 is disposed.

The elastic member 500 is formed as a torsion spring, one end of the elastic member 500 is coupled to the rotating member 400, and the other end thereof is coupled to the cover 200.

When the housing 300 in an open state is rotated to enter a closed state thereof, the elastic member 500 allows the user to easily rotate the housing 300 with a small force using an elastic force.

Specifically, one end of the elastic member 500 is coupled to the cover fixing protrusion 220 formed on the cover 200, and the other end is coupled to the link fixing protrusion 414 formed on the first connect bar 411.

In addition, a case in which the link fixing protrusion 414 is positioned above a virtual line 510 connecting a first hinge shaft 412 and the cover fixing protrusion 220 is in a state in which the housing 300 is being closed, and in this case, an elastic force is generated in which one end and the other end of the elastic member 500 are to be moved in a direction away from each other.

Conversely, a case in which the link fixing protrusion 414 is positioned Conversely, if the link fastening bumps (414) are located at the bottom of the virtual wire (510) connecting the first hinge axis (142) to the cover fastening bumps (220), the housing (300) is in the process of opening, creating an elastic force to tensile each other.

Accordingly, the elastic member 500 may easily close or open the housing 300.

Meanwhile, a distance between the link fixing protrusion 414 and the virtual line 510 in the state in which the housing 300 is opened is smaller than a distance therebetween in the state in which the housing 300 is closed.

Accordingly, when the user closes the housing 300 that is in an open state, the user slightly lifts the housing 300 by a short distance between the link fixing protrusion 414 and the virtual line 510, and when the link fixing protrusion 414 is moved above the virtual line 510, the housing 300 is semi-automatically closed by the elastic force of the elastic member 500.

That is, when the housing 300 in the open state is closed, since the housing 300 may be easily closed due to the elastic force of the elastic member 500, even in a case in which many objects or heavy objects are accommodated in the housing 300, the housing can be easily closed.

Hereinafter, an operation process of the vehicle glove box assembly according to another embodiment of the present disclosure formed to have the above-described structure will be described with reference to the accompanying drawings.

Figure 7A:
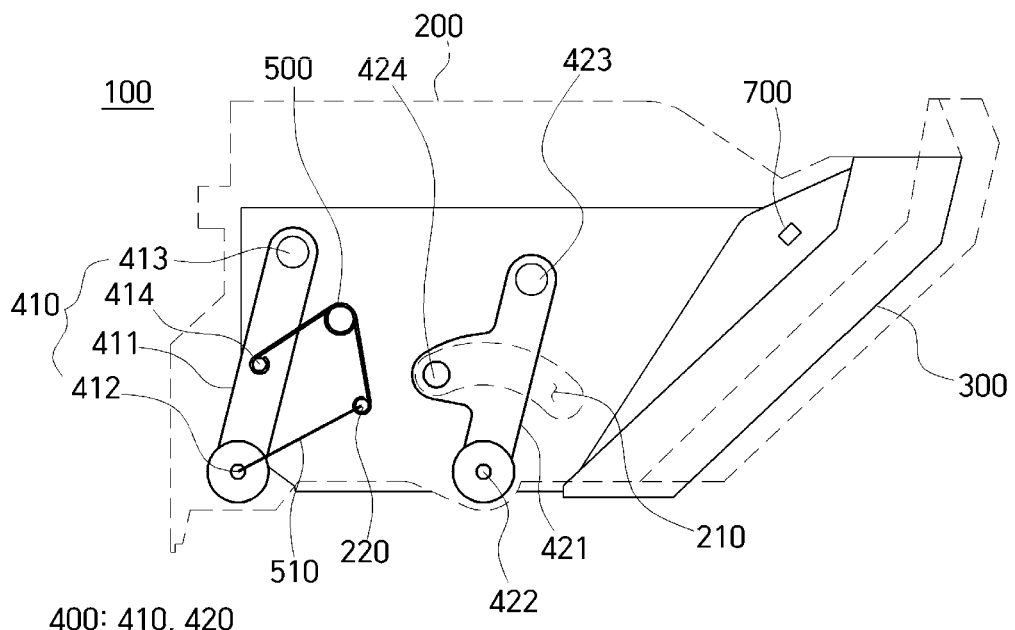
FIGS. 7A to 7C are views illustrating operation states of the vehicle glove box assembly according to another embodiment of the present disclosure.
Figure 7B:
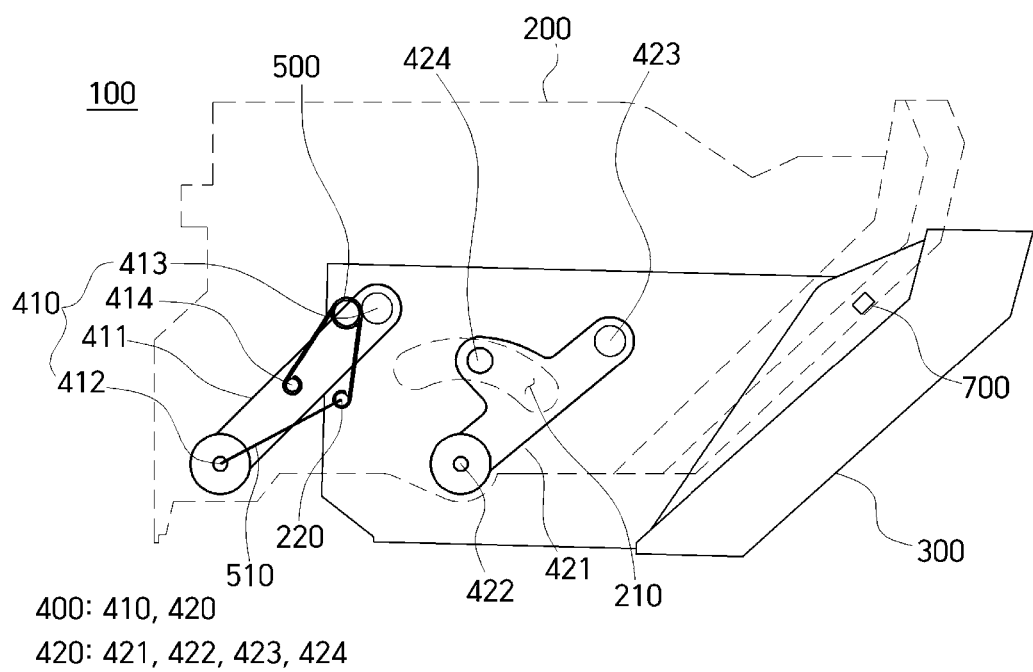
Figure 7C:
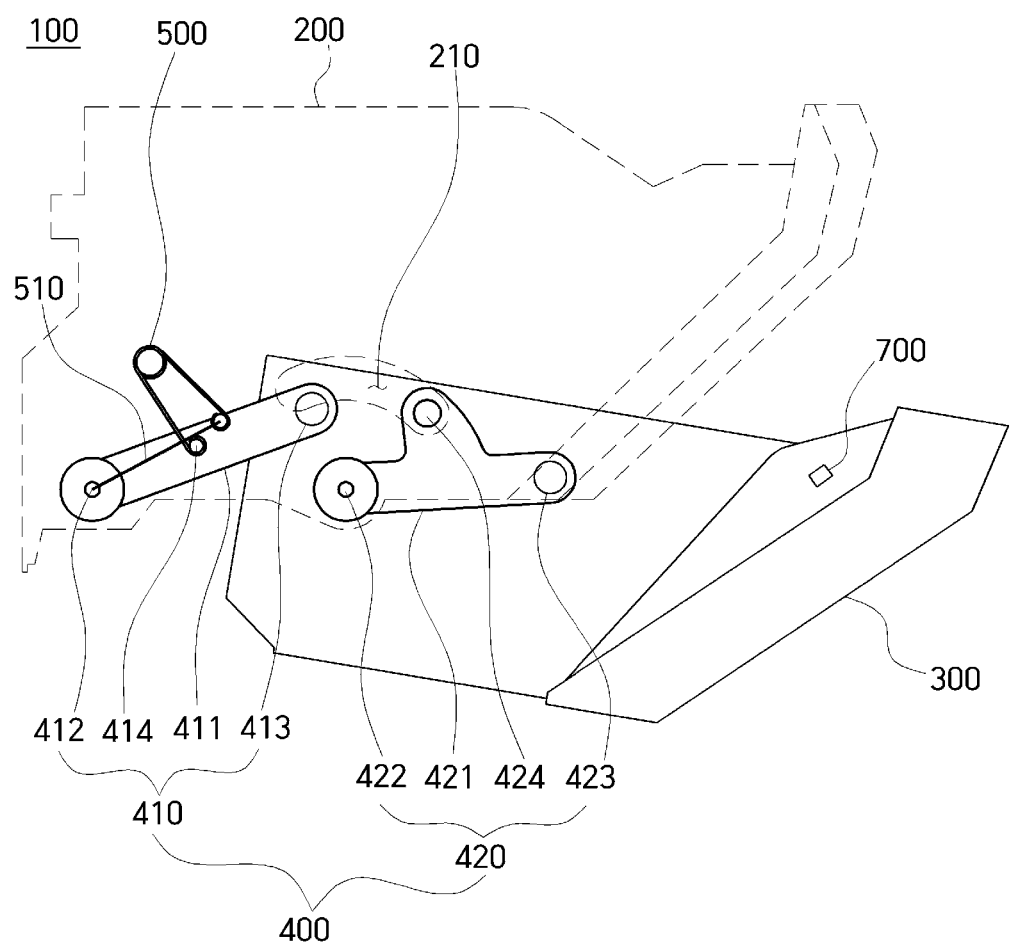

FIGS. 7A to 7C are views illustrating operation states of the vehicle glove box assembly according to another embodiment of the present disclosure.

Referring to FIGS. 7A, in a state in which the housing 300 is accommodated in and closed through the cover 200, a guide protrusion 424 of a second rotation link 420 is coupled to a guide hole 210, and in the state in which the housing 300 is accommodated in and closed through the cover 200, the guide protrusion 424 is disposed in a region, which is disposed at the rear side of the housing 300, in the guide hole 210.

In addition, one end of the elastic member 500 is coupled to the cover fixing protrusion 220 formed on the cover 200, and the other end is coupled to the link fixing protrusion 414 formed on the first connect bar 411.

Here, in a case in which the link fixing protrusion 414 is positioned above the virtual line 510 connecting the first hinge shaft 412 and the cover fixing protrusion 220, the housing 300 is disposed in and closed through the cover 200.

When the housing 300 is opened through the cover 200, as illustrated in FIG. 7B, the second rotation link 420 rotates about a second hinge shaft 422 along the guide hole 210.

In addition, the first rotation link 410 rotates while the elastic member 500 is elastically compressed, and the link fixing protrusion 414 approaches the virtual line.

Then, as illustrated in FIG. 7C, when the housing 300 is completely opened through the cover 200, the link fixing protrusion 414 is positioned under the virtual line 510 connecting the first hinge shaft 412 and the cover fixing protrusion 220.

In this case, an elastic force is generated in which one end of the elastic member 500 and the other end thereof are to be tensile between each other.

In addition, a distance between the link fixing protrusion 414 and the virtual line 510 in a state in which the housing 300 is opened is smaller than a distance therebetween in the state in which the housing 300 is closed.

Accordingly, when the user closes the housing 300 that is in the open state, the user slightly lifts the housing 300 by a short distance between the link fixing protrusion 414 and the virtual line 510, and when the link fixing protrusion 414 is moved above the virtual line 510, the housing 300 is semi-automatically closed by the elastic force of the elastic member 500.

Accordingly, in the vehicle glove box assembly according to another embodiment of the present disclosure, when the housing 300 in the open state is closed, since the housing 300 may be easily closed due to the elastic force of the elastic member 500, even in a case in which many objects or heavy objects are accommodated in the housing 300, the housing can be easily closed.

Meanwhile, a housing 300 according to still another embodiment of the present disclosure may be opened or closed using a rotation guide part 600.

Hereinafter, a vehicle glove box assembly according to still another embodiment of the present disclosure will be described.

Figure 8:
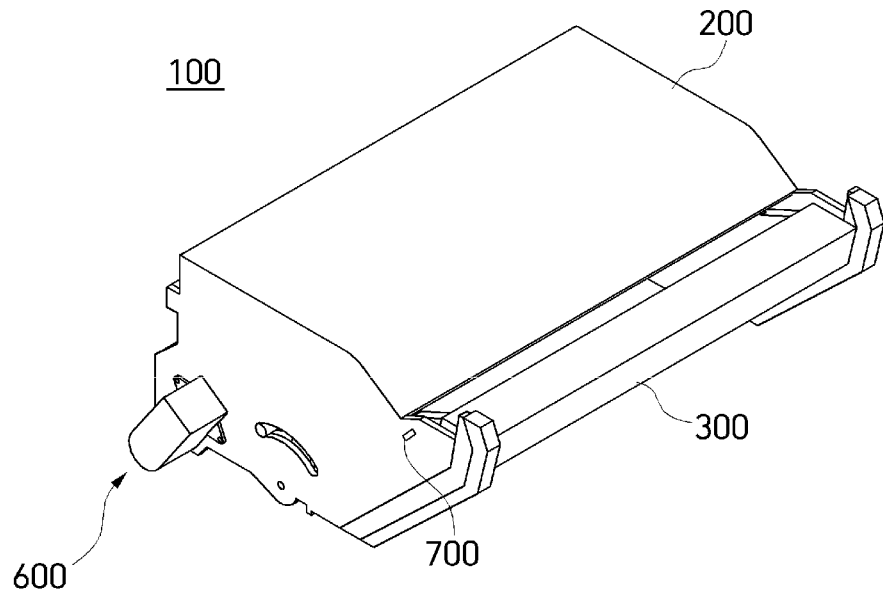
FIG. 8 is a perspective view illustrating a vehicle glove box assembly according to still another embodiment of the present disclosure.
Figure 9:
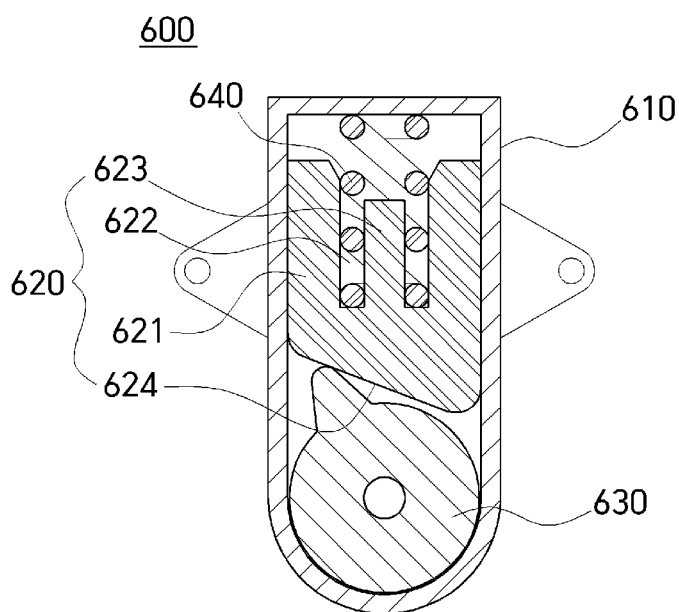
FIG. 9 is a cross-sectional view illustrating a rotation guide part according to still another embodiment of the present disclosure.
Figure 10:
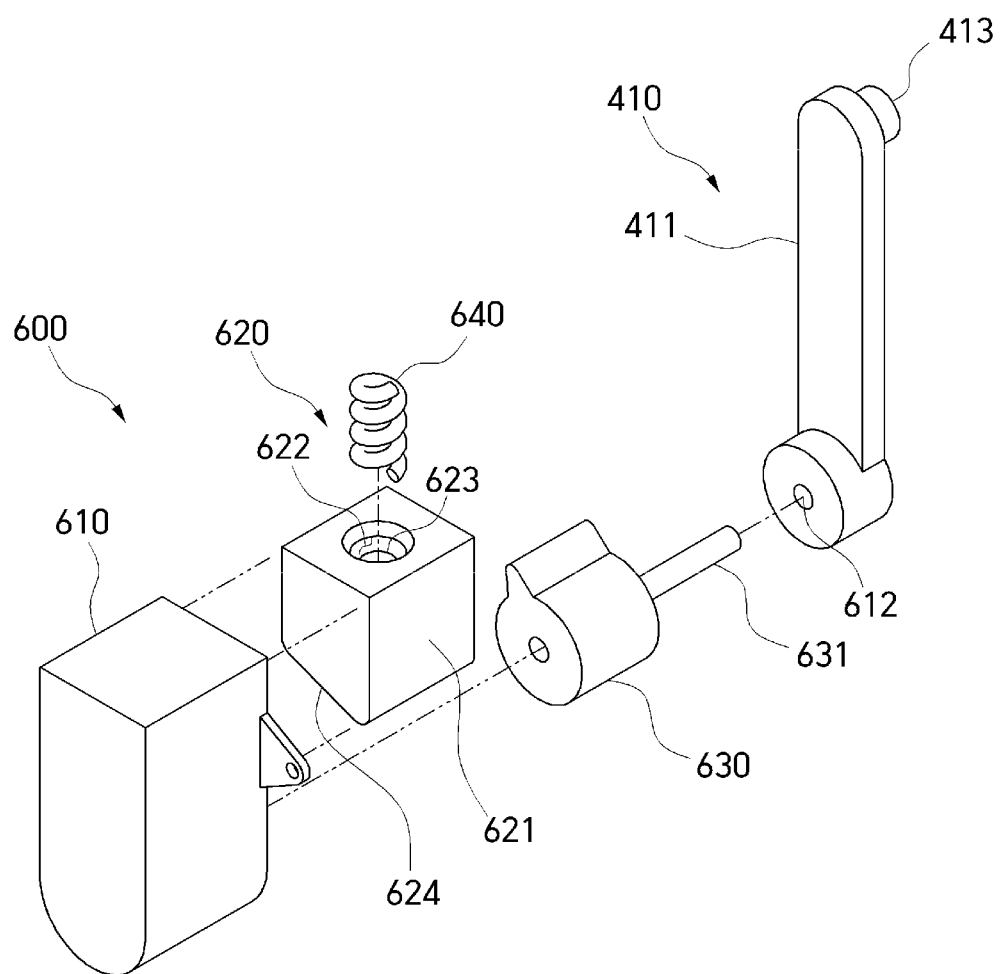
FIG. 10 is an exploded perspective view illustrating the rotation guide part and a first rotation link according to still another embodiment of the present disclosure.

FIG. 8 is a perspective view illustrating the vehicle glove box assembly according to still another embodiment of the present disclosure, FIG. 9 is a cross-sectional view illustrating the rotation guide part according to still another embodiment of the present disclosure, and FIG. 10 is an exploded perspective view illustrating the rotation guide part and a first rotation link according to still another embodiment of the present disclosure; and Referring to FIGS. 8 to 10, the rotation guide part 600 is a part fixed to an outer side surface of a cover 200 and is coupled to a rotating member 400 to elastically guide a rotational direction of the rotating member 400.

The rotation guide part 600 includes a case 610, a support part 620, a cam part 630, and a pressurizing member 640.

The case 610 is provided with an accommodation space formed therein and is fixed on the outer side surface of the cover 200 at a position corresponding to a first hinge shaft.

The case 610 is fixed to the outer side surface of the cover 200 using a bolt member.

The support part 620 is accommodated in the case 610 to be vertically slidable.

The support part 620 includes a body part 621, an accommodation part 622, an extension part 623, and an inclined part 624.

The body part 621 forms a body of the support part 620 and is accommodated in the case 610.

The accommodation part 622 is formed in an upper surface of the body part 621 to have a groove shape in a downward direction and accommodates the pressurizing member 640.

An inner circumferential surface of the accommodation part 622 is formed to be greater than an outer circumferential surface of the pressurizing member 640.

Accordingly, the pressurizing member 640 may be easily inserted into the accommodation part 622 and compressed or relaxed.

The extension part 623 extends in the accommodation part 622 in an axial direction.

An outer circumferential surface of the extension part 623 is spaced apart from the inner circumferential surface of the accommodation part 622 and formed to be smaller than an inner circumferential surface of the pressurizing member 640.

Accordingly, the pressurizing member 640 may be easily fitted into the extension part 623.

In addition, the extension part 623 may be effectively prevented from buckling when the pressurizing member 640 is compressed.

The inclined part 624 is formed to be inclined in one direction from a lower surface of the body part 621.

The cam part 630 is formed under the inclined part 624 to allow the case 610 to be vertically and slidably moved when the cam part 630 rotates.

Specifically, the inclined part 624 is inclined in an upward direction of the case 610 from one end of the lower surface of the body part 621 toward the other end thereof in an outward direction.

The inclined part 624 guides a rotational direction of the cam part 630 disposed thereunder.

The cam part 630 is rotatably disposed under the support part 620 in the case 610.

When the user opens or closes the housing 300, the cam part 630 vertically and slidably moves the support part 620 in the case 610.

As illustrated in FIG. 10, the cam part 630 is coupled to a first hinge shaft of a first rotation link 410 by a rotating shaft 631.

That is, the cam part 630 rotates according to rotation of the first hinge shaft in the same direction and at the same speed.

In addition, a curved portion of the cam part 630 is in contact with a lower surface, that is, the inclined part 624 of the support part 620.

In this case, in a state in which the housing 300 is open, the curved portion of the cam part 630 is positioned at one end of the inclined part 624.

Conversely, in a state in which the housing 300 is closed, the curved portion of the cam part 630 is positioned at the other end of the inclined part 624.

Meanwhile, as illustrated in FIG. 9, a round portion is formed on a corner at one end side of the inclined part 624.

When the curved portion of the cam part 630 is disposed at one end side of the inclined part 624, the curved portion is disposed on the round portion.

That is, in the state in which the housing 300 is open, the round portion of the inclined part 624 prevents the curved portion of the cam part 630 from sliding from one end side to the other end side of the inclined part 624 by itself.

Accordingly, the housing 300 in the open state may be prevented from being closed by itself.

The pressurizing member 640 is formed as a compression coil spring and accommodated in the accommodation part 622 of the support part 620.

In addition, one end of the pressurizing member 640 is in contact with an inner surface of an upper side of the case 610, and the other end thereof is in contact with of the accommodation part 622.

Accordingly, the pressurizing member 640 is accommodated in the accommodation part 622 and presses the support part 620 in a direction in which the cam part 630 is disposed.

Specifically, when the curved portion of the cam part 630 is in contact with the inclined part 624, the pressurizing member 640 is maximally compressed, and the support part 620 is disposed at the upper side in the case 610.

In addition, when the curved portion of the cam part 630 is moved from one end and is in contact with the other end of the inclined part 624, the pressurizing member 640 is elastically relaxed, and the support part 620 is disposed at a lower side in the case 610.

In this case, the cam part 630 may be easily and slidably rotated in a direction from one end of the inclined part 624 to the other end thereof by pressurization of the support part 620 due to an elastic force of the pressurizing member 640.

Accordingly, the rotational direction of the cam part 630 is guided by the inclined part 624 and the pressurizing member 640.

In addition, the first rotation link 410 connected to the cam part 630 may be easily rotated in the same rotational direction as that of the cam part 630.

Accordingly, when the user closes the housing 300 in the open state, as the inclined part 624 elastically presses the curved portion of the cam part 630 due to the elastic force of the pressurizing member 640, the cam part 630 is rotated in a direction toward one end.

In addition, a first hinge shaft 412 of the first rotation link 410 connected to the cam part 630 is elastically rotated in the same direction as that of rotation of the cam part 630 so that the housing 300 is closed semi-automatically.

Accordingly, in the vehicle glove box assembly according to still another embodiment of the present disclosure, when the housing 300 in the open state is closed, since the housing 300 may be easily closed due to an elastic force of the rotation guide part 600, even in a case in which many objects or heavy objects are accommodated in the housing 300, the housing may be easily closed.

Figure 11A:
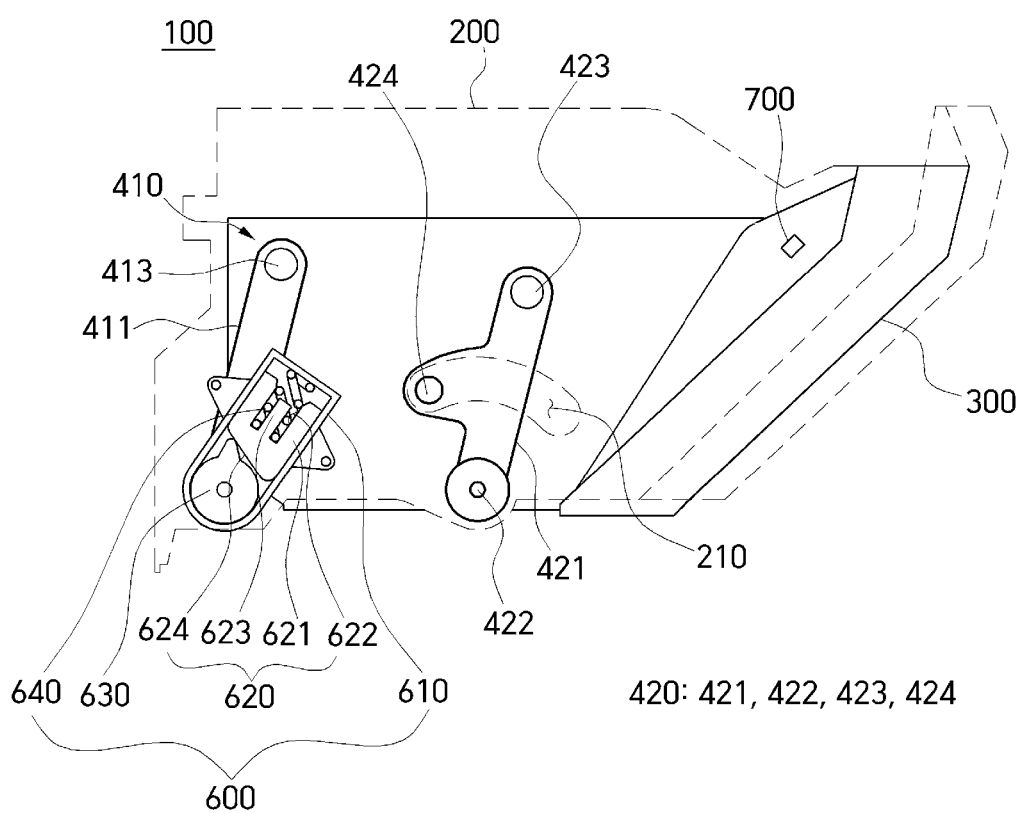
FIGS. 11A to 11C are views illustrating operation states of the vehicle glove box assembly according to still another embodiment of the present disclosure.
Figure 11B:
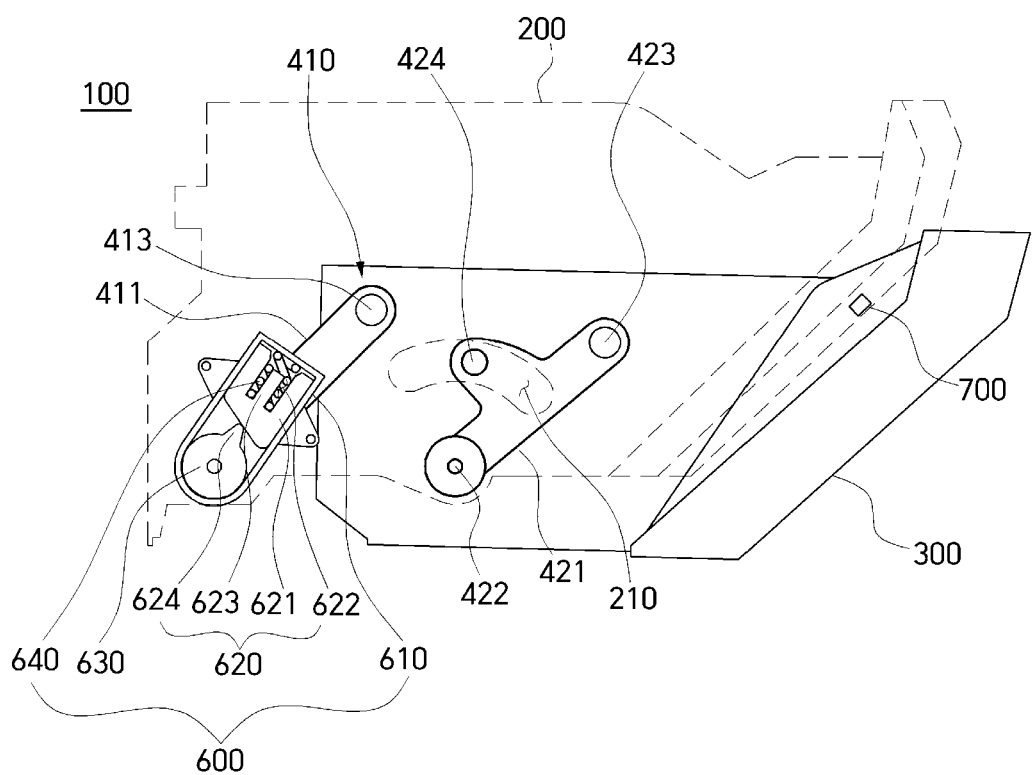
Figure 11C:
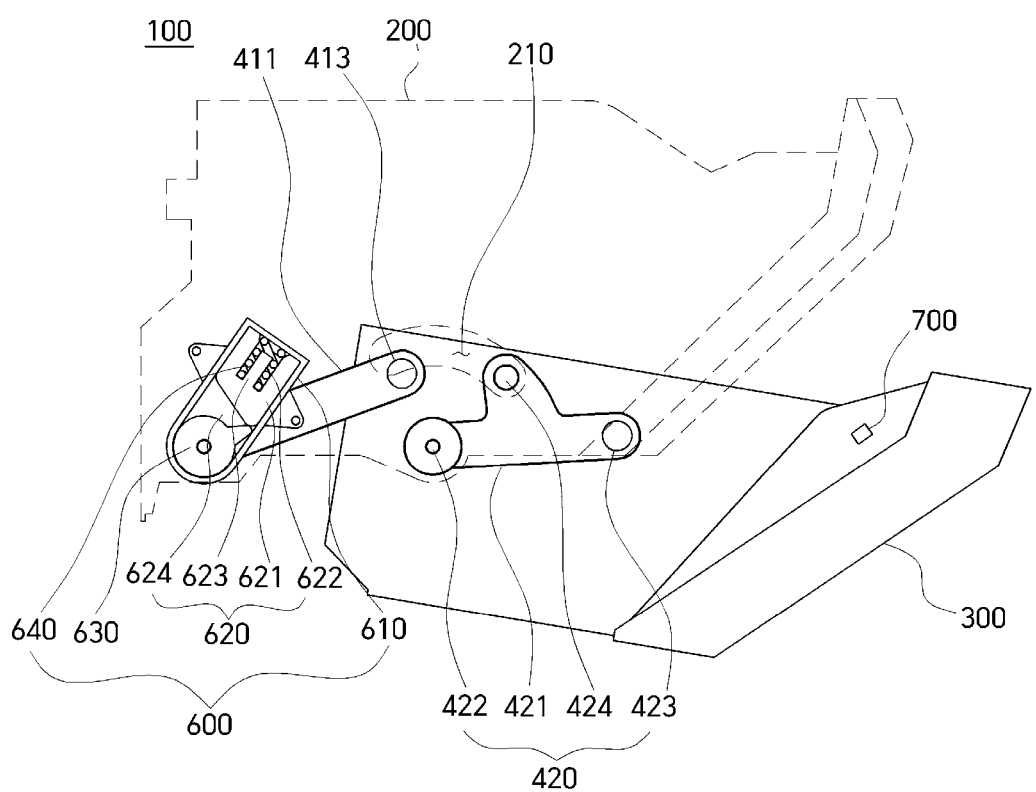

Hereinafter, an operation process of the vehicle glove box assembly according to still another embodiment of the present disclosure formed to have the above-described structure will be described with reference to the accompanying drawings FIGS. 11A to 11C are views illustrating operation states of the vehicle glove box assembly according to still another embodiment of the present disclosure.

Referring to FIGS. 11A, in a state in which the housing 300 is accommodated in and closed through the cover 200, a guide protrusion 424 of a second rotation link 420 is coupled to a guide hole 210, and in the state in which the housing 300 is accommodated in and closed through the cover 200, the guide protrusion 424 is disposed in a region, which is disposed at a rear side of the housing 300, in the guide hole 210.

In addition, the rotation guide part 600 which is coupled to the rotating member 400 to elastically guide the rotational direction of the rotating member 400 is fixed to the outer side surface of the cover 200.

When the curved portion of the cam part 630 forming the rotation guide part 600 is moved from one end of the inclined part 624 and is in contact with the other end thereof, the pressurizing member 640 is elastically relaxed, and the support part 620 is disposed at the lower side of in the case 610.

In addition, the curved portion of the cam part 630 is positioned at the other end of the inclined part 624 so that the housing 300 is closed in the cover 200.

When the user opens the housing 300 through the cover 200, as illustrated in FIG. 11B, the second rotation link 420 rotates about a second hinge shaft 422 along the guide hole 210.

In addition, the first rotation link 410 rotates while the curved portion of the cam part 630 rotates toward one end side of the inclined part 624.

Then, as illustrated in FIG. 11C, when the curved portion of the cam part 630 is positioned at one end of the inclined part 624, the pressurizing member 640 is maximally compressed, and the support part 620 is disposed at the upper side in the case 610.

In addition, the first rotation link 410 is rotated along the curved portion of the cam part 630 in a direction of one end while the housing 300 is opened through the cover 200.

In addition, when the user closes the housing 300 that is in an open state, the curved portion of the cam part 630 is moved from one end of the inclined part 624 and is in contact with the other end thereof while the pressurizing member 640 is elastically relaxed, and the support part 620 is disposed at the lower side in the case 610.

In this case, the cam part 630 is slidably and easily rotated in a direction from one end of the inclined part 624 toward the other end thereof by pressurization of the support part 620 due to the elastic force of the pressurizing member 640 so that the rotational direction is guided by the inclined part 624 and the pressurizing member 640.

In addition, the first hinge shaft 412 of the first rotation link 410 connected to the cam part 630 is elastically rotated in the same direction as that of rotation of the cam part 630 so that the housing 300 is closed semi-automatically.

Accordingly, in the vehicle glove box assembly according to still another embodiment of the present disclosure, when the housing 300 in the open state is closed, since the housing 300 may be easily closed due to the elastic force of the rotation guide part 600, even in a case in which many objects or heavy objects are accommodated in the housing 300, the housing may be easily closed.

Meanwhile, the elastic member 500 according to another embodiment of the present disclosure or the rotation guide part 600 according to still another embodiment of the present disclosure may be fixed to a reinforcement plate 800.

In addition, the reinforcement plate 800 may protect a first hinge shaft 412 of the first rotation link 410 and the second hinge shaft 422 of the second rotation link 420 which are exposed to the outside of the cover 200 from external foreign substances and prevent the first hinge shaft 412 and the second hinge shaft 422 from being exposed to the outside.

According to the present disclosure, since the first driving shaft 413 rotates about the first hinge shaft 412 to push the housing 300 in the forward direction, and the second driving shaft 423 rotates about the second hinge shaft 422 to rotate the housing 300 in the downward direction, an object can be accommodated in the rear portion and the upper portion of the housing 300, and thus there is an effect in that the storage capacity of the housing 300 can be significantly increased.

When the user closes the housing 300 that is in an open state, the user slightly lifts the housing 300 by a distance between the link fixing protrusion 414 and the virtual line 510, the link fixing protrusion 414 is moved above the virtual line 510, and thus the housing 300 is closed semi-automatically due to the elastic force of the elastic member 500. Accordingly, when the user closes the housing 300, there is an effect in that the housing 300 is easily closed due to the elastic force of the elastic member 500.

Since the cam part 630 is easily and slidably rotated in a direction from one end of the inclined part 624 toward the other end thereof by pressurization of the support part 620 due to the elastic force of the pressurizing member 640 so that the first hinge shaft 412 connected to the cam part 630 is rotated in the same direction as that of rotation of the cam part 630, the housing 300 is closed semi-automatically. Accordingly, when the housing 300 is closed, there is an effect in that the housing 300 can be easily closed due to the elastic force of the rotation guide part 600.

As described above, the exemplary embodiments disclosed in the present specification should be considered in illustrative sense for description only and not for purposes of limitation. The scope of present disclosure is defined not by the above-described description but by the appended claims, and all differences within the scope will be construed as being included in the inventive concept.

What is claimed is:

1. A vehicle glove box assembly of a vehicle, comprising:
   a cover which is accommodated in a dashboard of the vehicle, the cover having a front side that is open in a forward direction;
   a housing which is accommodated in the cover and is configured to selectively open or close the front side of the cover;
   a rotating member which is disposed between the cover and the housing and which is configured to have a rotation orbit; and
   an elastic member having a first end coupled to the rotating member and a second end coupled to the cover,
   wherein the elastic member is formed as a torsion spring which comprises a body portion in a shape of a coil, having an axis of rotation parallel to an axis of rotation of the rotating member, and two straight portions extending from two opposite ends of the body portion, and an angle formed by the two straight portions changes as the rotating member rotates, and
   the axis of rotation of the elastic member is spaced apart from the axis of rotation of the rotating member.

2. The vehicle glove box assembly of claim 1, wherein the rotating member includes:
   a first rotation link having a first end coupled to a lower portion of the cover and a second end coupled to an upper portion of the housing; and
   a second rotation link which is spaced apart from the first rotation link in the forward direction and having a first end coupled to the lower portion of the cover and a second end coupled to the upper portion of the housing.

3. The vehicle glove box assembly of claim 2, wherein the first rotation link includes:
   a first connect bar having a first end rotatably coupled to the lower portion of the cover and a second end rotatably coupled to the upper portion of the housing;
   a first hinge shaft formed at the first end of the first connect bar and coupled to the lower portion of the cover;
   a first driving shaft formed at the second end of the first connect bar and coupled to the upper portion of the housing; and
   a link fixing protrusion disposed between the first end and the second end of the first connect bar.

4. The vehicle glove box assembly of claim 3, wherein a cover fixing protrusion is disposed on the cover at a position spaced apart from the link fixing protrusion in the forward direction.

5. The vehicle glove box assembly of claim 4, wherein:
   the first end of the elastic member is coupled to the cover fixing protrusion; and
   the second end of the elastic member is coupled to the link fixing protrusion.

6. The vehicle glove box assembly of claim 5, wherein:
   when the link fixing protrusion is positioned above a virtual line connecting the first rotating shaft and the cover fixing protrusion, the rotating member is configured to elastically rotate in a direction in which the housing is closed; and
   when the link fixing protrusion is positioned under the virtual line, the rotating member is configured to elastically rotate in a direction in which the housing is opened.

7. The vehicle glove box assembly of claim 5, wherein a distance between the first end and the second end of the elastic member in a state in which the housing is closed is greater than a distance therebetween in a state in which the housing is open.

8. The vehicle glove box assembly of claim 2, wherein a guide hole having a fan shape is formed in the cover in a direction perpendicular to the second rotation link.

9. The vehicle glove box assembly of claim 8, wherein the second rotation link includes:
a second connect bar having a first end rotatably coupled to the lower portion of the cover and a second end rotatably coupled to the upper portion of the housing;
a second hinge shaft formed at the first end of the second connect bar and coupled to the lower portion of the cover;
a second driving shaft formed at the second end of the second connect bar and coupled to the upper portion of the housing; and
a guide protrusion which extends between the first end and the second end of the second connect bar in a rearward direction and is slidably coupled to the guide hole.

10. The vehicle glove box assembly of claim 9, wherein the guide hole is concentric with the second hinge shaft.

11. The vehicle glove box assembly of claim 9, wherein the guide protrusion is configured to slide along the guide hole to open or close the housing.

12. The vehicle glove box assembly of claim 9, wherein, when the housing is opened and the rotating member rotates along the guide hole in the forward direction, the housing is configured to rotate in a downward direction from the cover.

13. A vehicle glove box assembly of a vehicle, comprising:
a cover which is accommodated in a dashboard of the vehicle, the cover having a front side that is open in a forward direction;
a housing which is accommodated in the cover and is configured to selectively open or close the front side of the cover;
a rotating member which is disposed between the cover and the housing and which is configured to have a rotation orbit; and
an elastic member having a first end coupled to the rotating member and a second end coupled to the cover,
wherein the rotating member includes:
a first rotation link having a first end coupled to a lower portion of the cover and a second end coupled to an upper portion of the housing; and
a second rotation link which is spaced apart from the first rotation link in the forward direction and having a first end coupled to the lower portion of the cover and a second end coupled to the upper portion of the housing, and
wherein the first rotation link includes:
a first connect bar having a first end rotatably coupled to the lower portion of the cover and a second end rotatably coupled to the upper portion of the housing;
a first hinge shaft formed at the first end of the first connect bar and coupled to the lower portion of the cover;
a first driving shaft formed at the second end of the first connect bar and coupled to the upper portion of the housing; and
a link fixing protrusion disposed between the first end and the second end of the first connect bar.

14. The vehicle glove box assembly of claim 13, wherein a cover fixing protrusion is disposed on the cover at a position spaced apart from the link fixing protrusion in the forward direction.

15. The vehicle glove box assembly of claim 14, wherein:
the first end of the elastic member is coupled to the cover fixing protrusion; and
the second end of the elastic member is coupled to the link fixing protrusion.

16. The vehicle glove box assembly of claim 15, wherein:
when the link fixing protrusion is positioned above a virtual line connecting the first rotating shaft and the cover fixing protrusion, the rotating member is configured to elastically rotate in a direction in which the housing is closed; and
when the link fixing protrusion is positioned under the virtual line, the rotating member is configured to elastically rotate in a direction in which the housing is opened.

17. The vehicle glove box assembly of claim 15, wherein a distance between the first end and the second end of the elastic member in a state in which the housing is closed is greater than a distance therebetween in a state in which the housing is open.

18. A vehicle glove box assembly of a vehicle, comprising:
a cover which is accommodated in a dashboard of the vehicle, the cover having a front side that is open in a forward direction;
a housing which is accommodated in the cover and is configured to selectively open or close the front side of the cover;
a rotating member which is disposed between the cover and the housing and which is configured to have a rotation orbit; and
an elastic member having a first end coupled to the rotating member and a second end coupled to the cover,
wherein the rotating member includes:
a first rotation link having a first end coupled to a lower portion of the cover and a second end coupled to an upper portion of the housing; and
a second rotation link which is spaced apart from the first rotation link in the forward direction and having a first end coupled to the lower portion of the cover and a second end coupled to the upper portion of the housing, and
wherein a guide hole having a fan shape is formed in the cover in a direction perpendicular to the second rotation link.

19. The vehicle glove box assembly of claim 18, wherein the second rotation link includes:
a second connect bar having a first end rotatably coupled to the lower portion of the cover and a second end rotatably coupled to the upper portion of the housing;
a second hinge shaft formed at the first end of the second connect bar and coupled to the lower portion of the cover;
a second driving shaft formed at the second end of the second connect bar and coupled to the upper portion of the housing; and
a guide protrusion which extends between the first end and the second end of the second connect bar in a rearward direction and is slidably coupled to the guide hole.

* * * * *